Nov. 20, 1956 J. J. ZIMMERMAN 2,770,875

SOLDERING MACHINE

Filed June 9, 1952 7 Sheets-Sheet 1

INVENTOR.
Jack J. Zimmerman
BY
Foorman L. Mueller
Atty.

Nov. 20, 1956 J. J. ZIMMERMAN 2,770,875

SOLDERING MACHINE

Filed June 9, 1952 7 Sheets-Sheet 2

INVENTOR.
Jack J. Zimmerman
BY Foorman L. Mueller
Att'y.

Nov. 20, 1956 J. J. ZIMMERMAN 2,770,875

SOLDERING MACHINE

Filed June 9, 1952 7 Sheets-Sheet 3

INVENTOR.
Jack J. Zimmerman
BY
Foorman L. Mueller Atty.

Nov. 20, 1956 J. J. ZIMMERMAN 2,770,875

SOLDERING MACHINE

Filed June 9, 1952 7 Sheets-Sheet 4

INVENTOR.
Jack J. Zimmerman
BY
Foorman L. Mueller
Atty

Nov. 20, 1956 J. J. ZIMMERMAN 2,770,875

SOLDERING MACHINE

Filed June 9, 1952 7 Sheets-Sheet 5

Inventor
Jack J. Zimmerman
By Foorman L. Mueller Atty.

INVENTOR.
Jack J. Zimmerman
BY Norman L. Mueller
Atty.

Nov. 20, 1956 J. J. ZIMMERMAN 2,770,875

SOLDERING MACHINE

Filed June 9, 1952

7 Sheets-Sheet 7

INVENTOR.
Jack J. Zimmerman
BY
Foorman L. Mueller Atty.

United States Patent Office 2,770,875
Patented Nov. 20, 1956

2,770,875

SOLDERING MACHINE

Jack J. Zimmerman, Riverside, Ill., assignor to Motorola, Inc., Chicago, Ill., a corporation of Illinois Application June 9, 1952, Serial No. 292,424
19 Claims. (Cl. 29—503)

The present invention relates to an improved soldering method and apparatus and more particularly to a soldering machine for automatically soldering the circuit connections of an electrical assembly such as a radio receiver chassis or the like, to obtain soldered connections with a degree of uniformity and high quality heretofore unattained.

The basic techniques of manufacturing a radio receiver chassis have remained the same for many years. The usual procedure is to assemble and secure various components such as coils, transformers, tube sockets and the like to a suitably perforated and formed chassis. Thereafter, other smaller components such as resistors and condensers which may be supported and secured by their pigtail connections are connected to various terminals of the chassis, transformers, and sockets or the like by cutting and crimping the pigtail connections to their respective terminal points. Wires for interconnecting various terminals and socket connections are also cut to length and secured by crimping. In order to provide uniformly good electrically conductive joints at the various crimped wire ends, a soldered connection is formed by applying fluxed solder and transferring sufficient heat with a hand manipulated soldering iron or the like to effect a solder bond between the wires and terminals. Needless to say, a large amount of skilled manual labor is involved in cutting, crimping and soldering the many connections of a radio or television receiver.

In recent years printed circuit techniques have been developed in an effort to reduce the amount of manual labor involved in assembling and wiring a radio receiver. The conventional printed circuit procedure is to apply by suitable printing or coating processes a variegated design of conductive material on a chassis member of insulating material. The conductive material thus formed on the insulated chassis member establishes the electrical connections between various electrical components that are to be secured thereon and therefore eliminates the wire connections previously used. Opposite sides of the chassis member may be provided with different conductive coating designs to enable relatively complex electrical circuits to be formed. It has also been proposed to form resistors, coils, and condensers by suitable modifications of the arrangement and nature of the conductive coatings. Nevertheless, many additional electrical components such as tube socket contacts, condensers, etc., must be connected to the printed circuit on the chassis member and such connections are electrically bonded by soldering. Prior to this invention the soldering of such connections to a printed circuit chassis was done with the use of a manually operated soldering iron or by a so-called dip soldering technique. The manual soldering of the many connections to the printed circuit requires considerable hand labor and skill and is not economically feasible.

The dip solder technique while enabling a plurality of connections to be simultaneously soldered is not a satisfactory solution due to many limitations as follows: (1) Contacting the panel to the surface of molten solder transfers heat to the whole unit uncontrollably, not only wastefully applying solder to all exposed metal parts but subjecting the panel and components to a possibly deteriorating baking heat. Therefore the insulating material of the panel must be a substance to withstand such heat and moreover all components must be ceramic for the same purpose and the risk exists of change of electrical value. These heat resisting materials are all more expensive than otherwise necessary. (2) The dip soldering method precludes the possibility of using both sides of the panel thus limiting the extent of the circuity in a given area, and limiting the application of components to but one side of the panel. This reduces the overall compactness of the assembly, since nothing can be applied to the soldered side that would be deteriorated by immersing in molten solder. (3) The placement and physical holding of a component secured by the dip soldering method is only that of the bond of the printed circuitry to the chassis, if for instance, a printed circuit panel is used. (4) The dip soldering method prevents a complete assembly of necessary parts of a radio or television set prior to soldering since such things as potentiometers, control shafts, nuts, etc. could not project through the panel and be subject to molten solder immersion, for they would be ruined. Therefore, further assembly and manually soldered connections would be required after dipping to complete the product. (5) The use of Bakelite, even of the glass-filled heat resisting type (more expensive) incurs the risk of boiling the resins within the material and blistering or lifting the metal coating from the sheet, thus causing rejection for quality. The above are only a few of the disadvantages in using the dip soldering method which the novel soldering method and apparatus of the present invention overcomes.

In order to achieve the desired manufacturing economies with the use of printed circuit chassis members and to also obtain uniformly good soldered connections thereon, it is the object of the present invention to provide a new method and apparatus for simultaneously soldering all of the connections on one or both sides of a chassis member, with the required amounts of heat and solder for each different connection being automatically predetermined and controlled.

Another object of the invention is to provide an automatically cycled chassis assembling and soldering machine for simultaneously soldering all of the connections on either side of a plurality of chassis members in timed succession whereby the electrical connections of large numbers of electrical chassis assemblies may be completely and expeditiously soldered.

Still another object of the invention is to provide an improved soldering technique whereby the soldering of electrical connections to a printed circuit chassis is greatly facilitated in a manner enabling all soldered connections on one side to be made simultaneously with absolute control of the various different amounts of heat and solder to be supplied to the different electric connections to be soldered.

A feature of the invention is the novel method of simultaneously soldering a plurality of electrical connections, which method may be termed contact soldering, and which includes the steps of forming globules of solder having convex meniscus shaped upper surfaces on the upper ends of a plurality of upwardly projecting heat conducting members, controlling the heat transfer capacities of the members to that required for each individual connection by the form and volume of their respective body structures, and raising simultaneously the heat conductive members to contact the upper meniscus surfaces of the solder globules thereon with the plurality of electrical connections to be soldered while still maintaining their base portions in a bath of molten solder, whereby heat flow is regulated and transferred to the electrical connections and the solder is caused to flow by the wetting action of the solder to bond over a controlled area of the respective connections. With such method, the control of the amount of the soldered area is determined by the amount and rate of heat transfer thereto from the molten solder supply by means of the heat conductive members.

Another feature of the invention is the provision of a soldering machine having means to support and position an electrical chassis member in a predetermined position over a container of molten solder, together with means for elevating a platform support having mounted thereon a plurality of upwardly projecting heat conductive soldering members. Each heat conductive member is provided with a cup-shaped depression of a depth to allow clearance of a projection to be soldered and adapted to contain a globule of solder on its upper end, and the soldering platform is arranged to be submerged in the container of molten solder and provided with lever means to raise the platform from the molten solder and carry the solder globules on the ends of the projecting solder cups into contact with respective electrical connections or component mounting tabs to be soldered on the underside of the chassis member. In such an arrangement, the areas and volume of the soldered portions of the connections may be predetermined and the extent of the solder flow controlled through heat transfer by the form and volume of the heat conductive projecting solder members even though the solder globules on the ends of all of the solder members are in contact with their respective connections to be soldered for the same period of time.

An important and novel advantage of the soldering method and apparatus of the invention is that complete assembly of all components on both sides of a chassis may be effected since the solder members are designed to apply solder only locally where needed and in their elevation project through and among the various projecting components and even tubes which may be previously applied to the chassis. Obscure soldering connections can be effected through such small space, and with such precision of travel that a component would not be heat damaged even where it would be impossible to manually solder with a soldering iron due to the iron size or inaccuracy of manual approach. Further, in such a case, the solder member could be encased in a non-heat radiating sleeve of asbestos or the like to reduce radiation of heat to a component in close proximity to the solder member. Reduction of size of the product by designing compactness is thus a feature made possible by this invention. Flux may be applied in the same manner and is regulated as to amount and area covered and is therefore used at a most economical rate and the product does not require cleaning with a flux solvent after soldering to remove excess flux. For the same reason the use of solder is most economical since only the uniform amount required to effect a joint of good electrical characteristics is used, not uncontrollably covering all exposed metal as in the previously mentioned dip solder technique.

The solder method and apparatus of the invention is in no sense similar to a dip soldering technique since there need be no projection beyond a chassis surface, and a local solder spot or spots may be directed to a controlled area. A hole which is metal-eyeleted by any means can be filled with solder, and the solder caused to flow on the opposite side of the panel to effect a mechanically strong holding joint for a mounting tab through the hole. Thus, the present invention provides for the soldering and securing of an object on both sides of a hole by keying with solder, which makes possible the physical securing of components to the panel without the use of screws or other fasteners and regardless of the strength of the bond of printed metal circuitry to the panel.

A further feature of the invention is the provision of a conveyor structure for intermittently conveying and positioning a plurality of successive chassis members over a container of molten solder having the elevating soldering mechanism referred to in the preceding features of the invention whereby the electrical connections of a plurality of identical chassis members carried thereby may be quickly soldered in a continuously cycled assembly line fashion.

Yet another feature of the invention is the novel arrangement of a chassis supporting member or pallet assembly carried by a conveyor chain or the like and having means to exactly predetermine the rest position of the pallet and chassis member over the molten solder container as the conveyor is intermittently brought to rest to thereby enable the soldering mechanism to be raised from within the molten solder container for establishing contact in correct registry between the respective points to be soldered and the solder members.

A still further feature of the invention is the novel form of upwardly projecting heat conductive solder members to be alternately raised and lowered from within a molten solder container toward the underside of the chassis member having the connections to be soldered. The solder member is preferably made of aluminum which supplies the desired rate of heat transfer and is provided with a chromic acid anodized external coating that will not permit the aluminum to be dissolved in and contaminate the molten solder. The cup-shaped depression on its upper end is lined with steel or other metal having good solder wetting properties and yet will not be dissolved by the solder whereby the occlusion of gases within the solder cup is prevented. In such an arrangement the outer surface of the upper end portion of the solder cup may also be coated with a refractory cement or the like to function as a wick for absorbing excess flux which may have been previously applied to the electrical connection to be soldered.

Another feature of the invention is the provision of a conveyor type of soldering machine for soldering the electrical connections of a plurality of chassis members in timed succession, the machine having a pair of molten solder containers and associated soldering mechanism, each of the solder containers being positioned at spaced stations along the path of conveyor travel with intermediate station positions being provided for applying flux and the addition of electrical components to the chassis when desired whereby the connections on one side of a chassis member may be simultaneously soldered by the mechanism of one solder container and thereafter the chassis member may be turned over and additional components added with their connections to be soldered by the mechanisms of the other solder container as the conveyor is intermittently actuated in step-by-step timed relation from station to station.

Yet another feature of the invention is the provision of a novel form of heat shielding cover for each solder container to be automatically opened upon arrival thereover of a chassis to be soldered and to be closed upon lowering of the soldering mechanism after soldering the connections on the underside of the chassis member whereby the cooling of the soldered connections is facilitated and controlled and the electrical components are protected from heat damage by convection or radiation.

Another feature of the invention, in a modified form, is the provision of a soldering mechanism adapted to be alternately raised and lowered within a bath of molten solder, the mechanism including an upwardly projecting heat conducting solder cup of tantalum tungsten or the like having a bored upper end for containing a globule of molten solder together with an automatically operated plunger member within the bored upper end to purge the bore of solder, flux and occluded gases and which also functions as a valve for maintaining the cup full of solder as it rises out of the solder after each successive submersion of the mechanism in the container of molten solder.

Yet another feature of the invention is the provision of a wiper mechanism to skim the surface of the molten solder in the solder container prior to each soldering operation to remove oxides and carbonized flux.

Further objects, features and the attending advantages of the invention will be apparent with reference to the following specification and drawings, in which:

Fig. 4 is a detailed elevation of the solder container with the chassis supporting pallet assembly of the conveyor positioned thereover;

Figure 8:
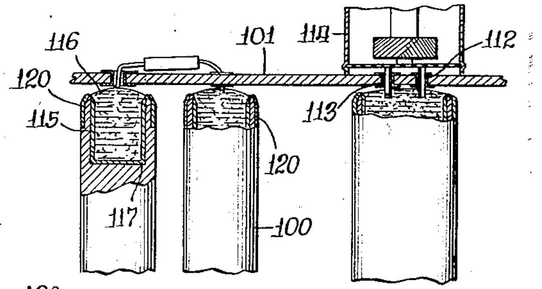
Fig. 8 is a fragmentary detail partly in section showing the soldering cups in soldering position and the method of soldering.
Figure 8A:
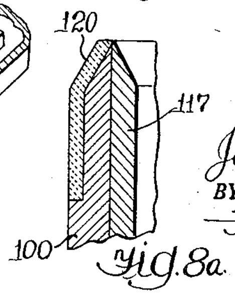
Figure 9:
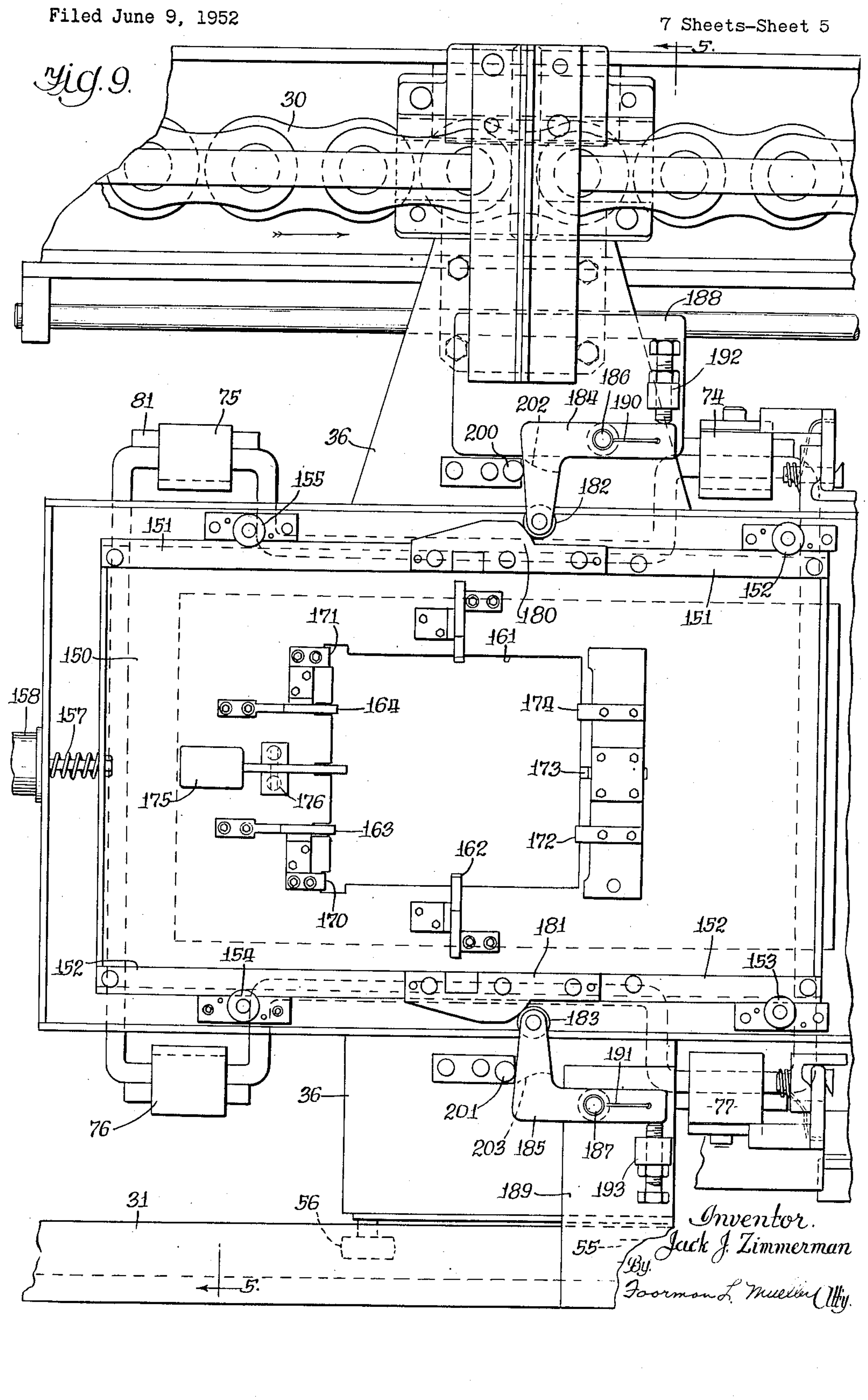
Figure 10:
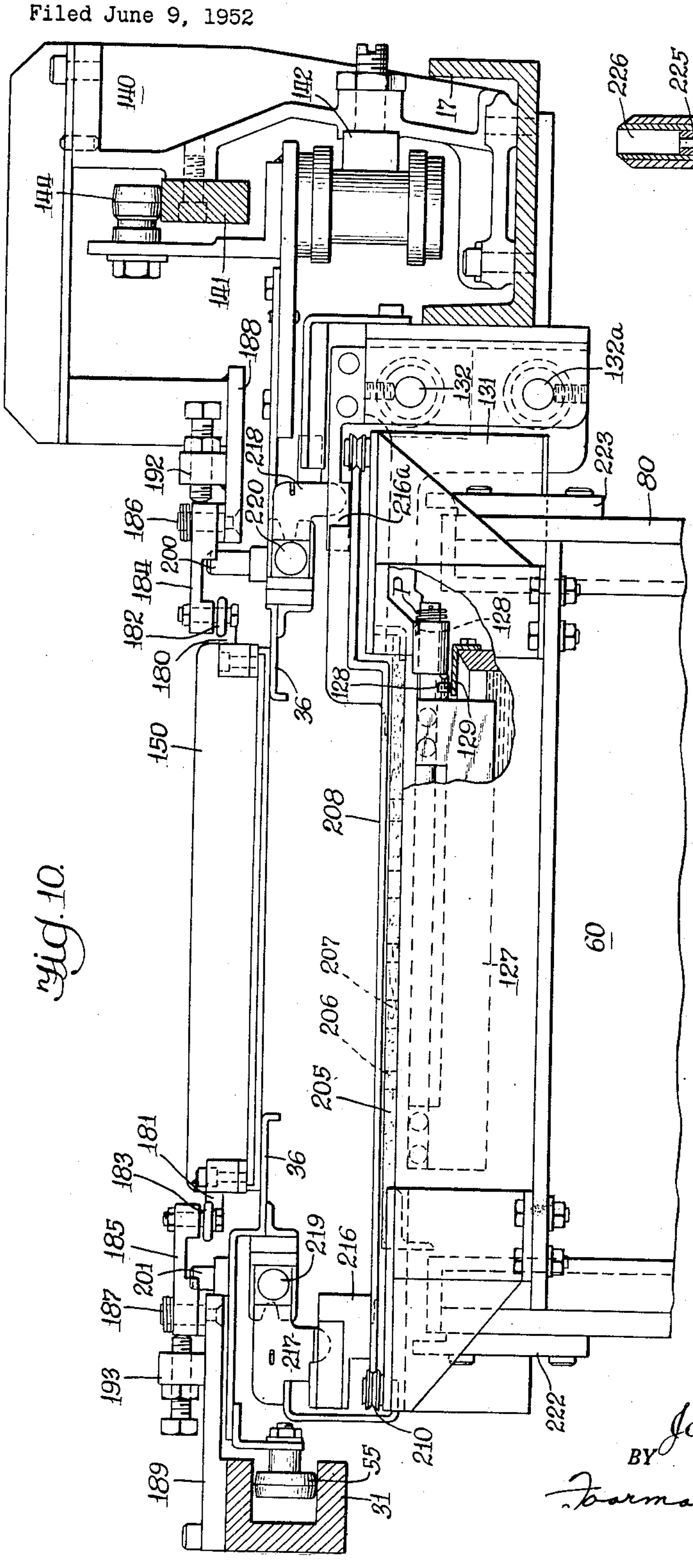
Figure 11:
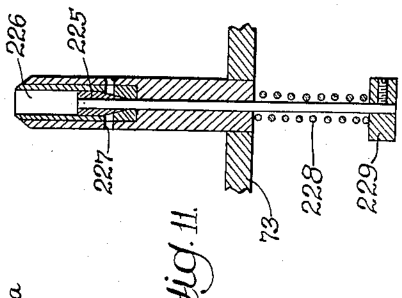
Figure 12:
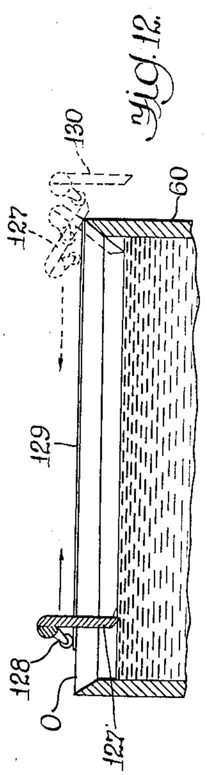
Figure 13:
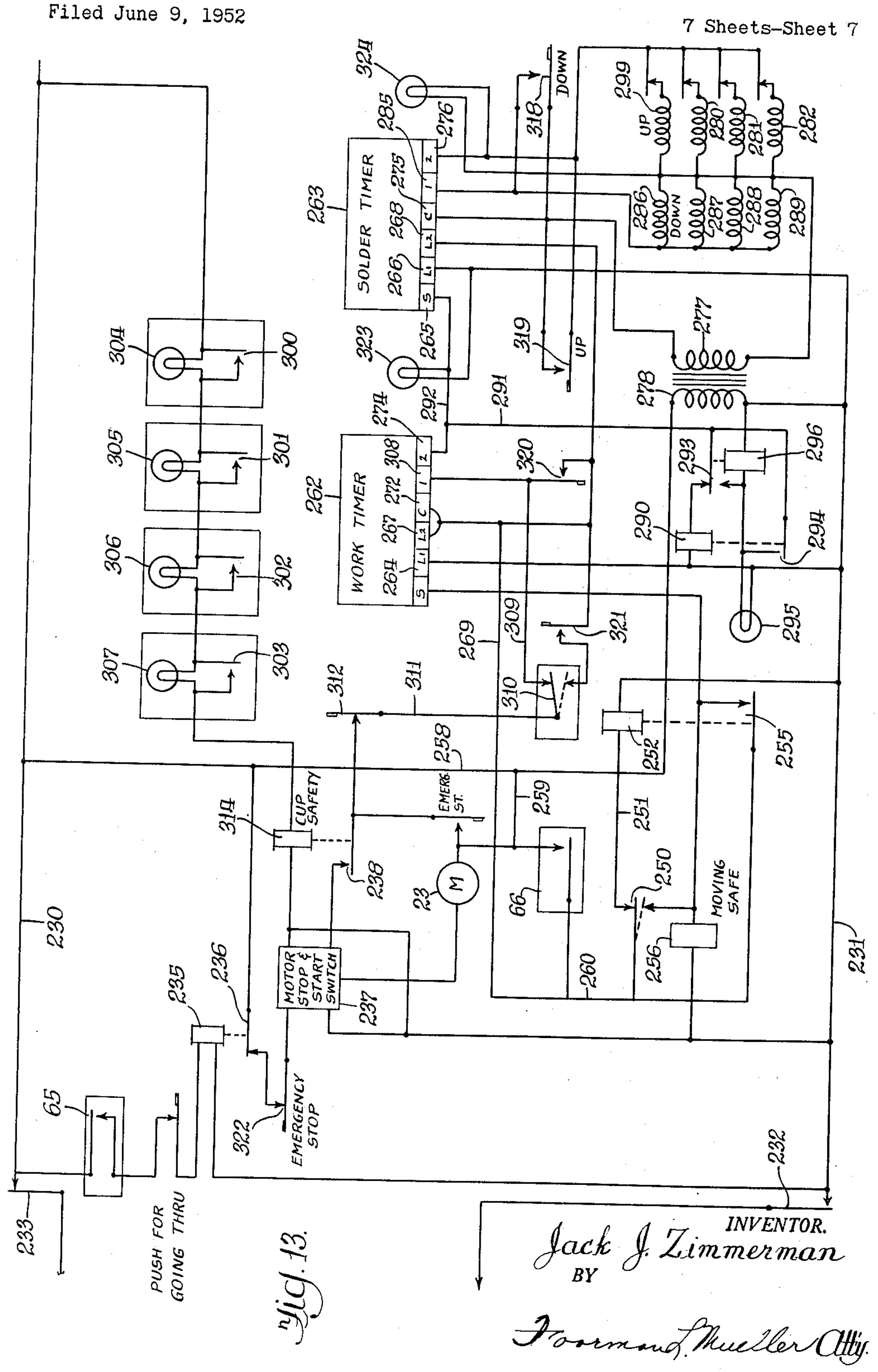

Fig. 8*a* is an enlarged fragmentary detail of a soldering cup of Fig. 8;

Fig. 9 is an enlarged top plan view of the chassis supporting pallet assembly in the resting position over the molten solder container;

Fig. 10 is a fragmentary end view of the upper end of the solder container and a cross-section through the conveyor supporting rail to show the manner of guiding the chassis supporting pallet assembly thereon;

Fig. 11 is a detail cross-section of a modified form of self-purging heat conducting soldering cup;

Fig. 12 is a fragmentary view to show the operation of the solder wiping mechanism for the molten solder containers; and Fig. 13 is a wiring diagram of an electrical control circuit for the machine.

In practicing the invention, a horizontally moving endless conveyor chain is mounted on a suitable elongated machine framework. The chain is maintained under spring tension and is driven through a sprocket and suitable electric motor drive mechanism. The electrical chassis member to be soldered will hereafter be referred to as the workpiece. A plurality of workpiece supporting pallet assemblies are fixed to the conveyor chain at regularly spaced intervals to be moved therewith. The path of movement of the pallet assemblies and conveyor chain is accurately determined by guide rails of the machine framework cooperating with suitable rollers on the pallet assembly. The workpiece, which may be a printed circuit sheet chassis member of insulating material, is supported by the pallet assembly for movement therewith in generally horizontal plane.

The endless conveyor is arranged to be intermittently operated to convey successive ones of the pallet assemblies and workpieces to successive stations of a plurality of regularly spaced stations along the conveyor path of travel, at which stations successive pallet assemblies are positioned during intervals when the conveyor is at rest. At each of two widely spaced conveyor stations which may be termed soldering stations, a molten solder container with the elevating soldering mechanism of the invention is positioned beneath the resting position of the pallet assembly and workpiece. The two conveyor stations immediately preceding the soldering stations are provided with container structures and elevating mechanisms that are similar to those of the soldering stations except that they are adapted to contain liquid flux instead of solder. When the workpieces are positioned at these stations, flux may be applied to the electrical connections to be soldered. The remaining intervening conveyor stations provide resting positions for the pallets where various manual operations such as the addition to the workpieces of components to be soldered may be performed and where the workpieces may be inserted, removed or turned over for soldering connections on first one or the other side thereof.

The molten solder containers are provided with electric heating coils while the liquid flux containers do not require the use of heating coils as the flux is normally liquid at room temperature. For the sake of uniformity of design, all of the containers are otherwise similar and the elevating mechanism for applying either flux or solder is likewise the same so that the following brief description of a single soldering mechanism will suffice. Positioned within the molten solder container is a platform that is adapted to be raised and lowered. A plurality of upwardly extending projections or solder cup members of high heat conductive material are fixed to the platform. Each of the solder cup members may be in the form, for example, of an anodized aluminum rod counterbored at one end to provide a cup-shaped depression. The solder members are positioned to contact a respective electrical connection on the workpiece to be soldered when the platform is raised. The shapes and sizes of the different solder members are proportioned to transfer the required heat and solder from the bath of molten solder to produce the particular desired size and shape of soldered connections.

The cup-shaped depression in the upper end of each solder member may be lined with steel and is adapted to convey molten solder therein into contact with the electrical connections to be soldered. There is a wetting action to the steel lining in the cup-shaped depression, and around the cup there is a non-wetting surface or rim comprising refractory cement on the anodized aluminum rod and at the rim of the steel lining. This combination causes the upper surface of the solder globule to have a convex menicus shape because the rim portion on the cup will not permit the meniscus to run off. In raising the platform, after the conveyor has moved a workpiece into position over the solder container, the platform elevating mechanism is caused to decelerate at the moment that the meniscus surface of the solder globules on the various projections establish contact with the respective electrical connections to be soldered in a manner to prevent splattering and destroying the convex shape of the solder. Thereafter the elevating mechanism is brought to a complete stop with the end portion of the solder members almost establishing a physical contact with the electrical connections and with the base portions of the solder members still immersed in the heated volume of molten solder. The elevated position is maintained for a predetermined period of time sufficient to heat the electrical connections by transfer of heat through the solder from the soldering members and cause the solder to flow by its wetting action onto the electrical connection to the desired extent. The larger connections, requiring a large soldered area, are heated to a greater extent by providing a larger bodied soldering member therefor so that more heat will be transferred and the solder conveyed thereto will flow over a larger area before freezing. The above factors are a very important feature of the method and apparatus of the invention, since the production of uniformly good soldered connections is thereby obtained.

After a predetermined soldering time interval, the elevating mechanism is operated to again lower the platform into the molten solder container whereby the solder member cups are again filled with molten solder. Thereafter, the conveyor is caused to move a succeeding pallet assembly and workpiece into position over the solder container.

In order to precisely predetermine the rest position of the workpiece over the solder container and the soldering members therein, the pallet assembly is constructed to allow for small variations in the stopping position of the conveyor. For such purpose, the pallet assembly is comprised of a main frame supported by rollers on the previously mentioned guide rails and fixed to the conveyor chain for movement therewith. An inner frame or sub-pallet assembly on which the workpiece is secured, is slideably positioned within the main frame and normally urged to one side in the direction of conveyor movement by a spring tension mechanism including a shock absorbing device. A pair of cam projections or abutments are fixed to the sub-pallet assembly inner frame and are engaged by suitable projections on the conveyor frame to exactly position the sub-pallet and workpiece at the desired resting position over the solder container with the electrical connections to be soldered in exact alignment with the respective soldering members. The conveyor and main pallet frame may thereafter continue to move relative to the sub-pallet a slight amount against the spring tension mechanism to allow for variable amounts of conveyor overtravel due to conveyor inertia, friction forces and the like. After soldering, the resumption of movement of the conveyor and pallet main frame is effective to disengage the cam projections of the sub-pallet frame so as to permit the passage of the workpiece from the soldering station.

A large amount of heat would normally rise from the molten solder containers to delay the freezing of the soldered joints and otherwise injure the various electrical components on the workpiece. In order to minimize the amount of heat radiated from the molten solder container, an asbestoes heat shielding cover having openings therethrough is positioned over the open end of the solder container. The soldering members are adapted to pass through the openings in the asbestos sheet as the platform is raised. A second asbestos sheet or cover having no openings therethrough is slideably positioned and normally urged to a position overlying the perforated asbestos cover. As the pallet assembly approaches the molten solder containers, the slideable asbestos cover is engaged thereby to be moved to expose the perforated cover. A latching mechanism responsive to the raising and lowering of the soldering cups is effective to cause the slidable asbestos cover to return to the normally urged position overlying the perforated asbestos cover after the soldering cups have been lowered into the solder containers.

Figure 1:
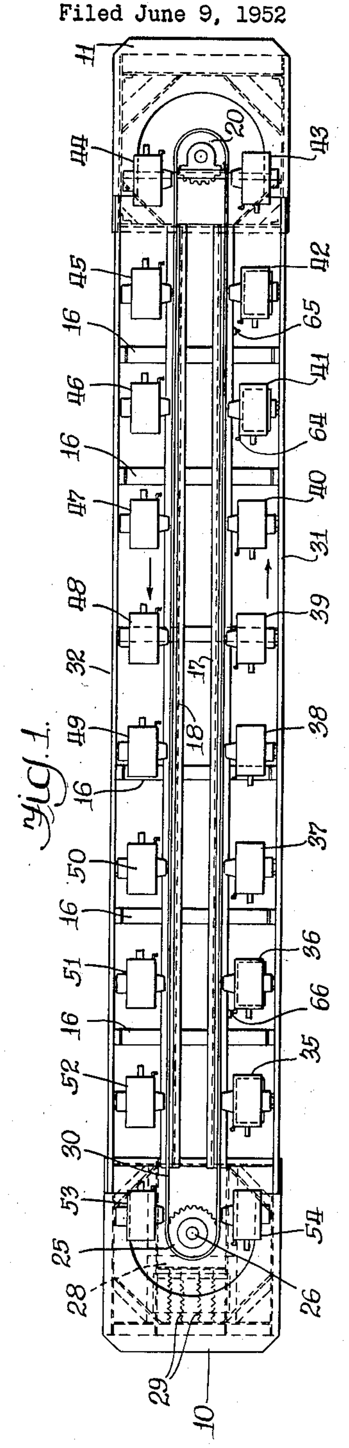
Fig. 1 is a diagrammatic top plan view of the complete soldering machine.
Figure 2:
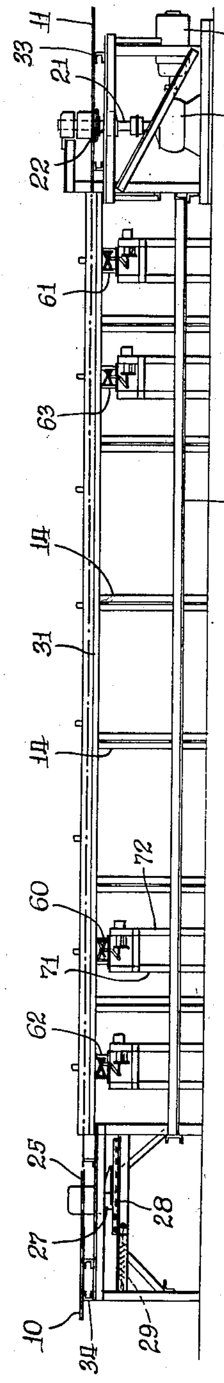
Fig. 2 is a side elevation of Fig. 1.

Referring to the drawings and more particularly to Figs. 1 and 2, the soldering machine is mounted on an elongated framework comprising end tables 10 and 11, longitudinally extending frame members such as the member 12, and a plurality of supporting leg members such as shown at 14. Suitable cross members such as shown at 16 are also provided and the longitudinally extending upper frame inner rails 17 and 18 are supported thereon. A conveyor chain sprocket gear 20 is mounted on a vertical shaft 21 in a suitable bearing 22 on the end table structure 11. An electric motor 23 and a gear-reducing transfer mechanism 24 is connected to drive the shaft 21 and conveyor chain sprocket 20. A second conveyor chain sprocket 25 is fixed to a vertically mounted spindle 26 supported in a suitable bearing 27 on a sliding sub-frame 28 of the end table 10. The sliding sub-frame 28 is normally urged to the left of the drawing by the action of a plurality of springs such as shown at 29. The arrangement of sliding sub-frame 28, springs 29 and conveyor chain idler sprocket 25 is such as to provide a suitable tension on the endless conveyor chain shown at 30 in a manner to prevent sagging of the chain and to assure that the chain will instantly respond to the driving impulses from the sprocket gear 20. The spring tension on the chain also insures proper alignment of the pallet assemblies to be hereinafter described, and maintains them at a position at right angles to the chain 30.

Upper outer guide rails 31 and 32 are also secured to the cross braces such as shown at 16 intermediate the end tables 10 and 11. The upper surfaces of the end tables 10 and 11 are supported in exact alignment with the upper surface of the guide rails 31 and 32, and for such purpose the supporting U-shaped members, such as shown at 33 and 34 may be provided. The conveyor chain has secured thereto at regularly spaced intervals a plurality of workpiece carrying pallet assemblies generally shown at 35 through 54. Each of the pallet assemblies 35–54 are identical and one of them will be more fully described in connection with other figures of the drawings. Each of the pallet assemblies such as 35 is provided with rollers 55 and 56 engaging a surface of the guide rail 31, 32 or the upper surface of the end tables 10 and 11 as the conveyor is moved. The inner end of the pallet assembly 35 is supported during straight line travel of the conveyor by a similar roller 144 on a guide rail such as shown at 141 (Fig. 6), supported on the frame members 17 and 18 to exactly predetermine the horizontal plane of movement of the pallet assembly. As previously mentioned, each of the pallet assemblies 35–54 are regularly spaced along the length of the endless conveyor chain 30 which is arranged to be intermittently operated in step-by-step fashion to advance each pallet assembly a distance equal to the distance between respective pallet assemblies. Therefore, at the moment when the conveyor is at rest the pallet assemblies are similarly at rest at regularly spaced conveyor stations along the path of conveyor travel and various operations may be performed on the workpieces supported by the pallet assembly.

At the conveyor stations where the pallet assemblies 36 and 42 are shown to be at rest in Figs. 1 and 2 of the drawings, the soldering mechanisms of the invention generally indicated at 60 and 61 are positioned. At the conveyor stations immediately preceding the soldering stations, and corresponding to the rest positions of the workpiece pallet assemblies 35 and 41, mechanisms similar to that shown at 60 and 61 are provided as indicated at 62 and 63 for purposes of applying flux prior to the soldering operations. The intermediate stations corresponding to the rest positions of the pallet assemblies 37–40 may be used for inserting the workpiece in the pallet assembly, and for adding electrical components to be soldered thereto. Similarly, the conveyor stations corresponding to the rest positions of the pallet assemblies 43–54 may be used for purposes of removing, turning over, and reinserting the workpiece together with adding electrical components to be secured. Most electrical assemblies, such as radio receivers or the like, are provided with considerably more soldered connections on one side of the chassis member than the other and under such circumstances the larger number of intervening conveyor stations at which the pallet assemblies 43–54 are shown to be at rest may be used for preparing the side of the chassis member having the larger number of electrical components and connections.

The conveyor chain 30 is arranged to be intermittently driven by the electric motor 23 and controlled by a suitable electric control circuit which will be later described in detail. Assuming that the conveyor chain 30 is moving in the direction of the arrows, an approaching pallet assembly will momentarily contact and close the microswitch 65 by a projection 64 carried on each pallet assembly. The momentary closing of the microswitch 65 is effective to actuate the control circuit to stop the conveyor movement. The conveyor, however, will not stop immediately due to its inertia and in fact the slow stop is brought about purposely through the operation of the control circuit as later described so that parts lying in a workpiece will not be disturbed, nor will there be a sudden stopping which might put undesirable strains on the machine. As the conveyor comes to a stop the microswitch 66 is closed by the pallet assembly coming to rest with its projection 64 in contact therewith. The closing of the microswitch 66 for a predetermined time interval after the conveyor has come to rest is effective to initiate the fluxing and soldering operations of the machine to be later described in detail. After the fluxing and soldering operations are completed, the control circuit is effective to again energize the conveyor motor 23 to start the movement of the conveyor and to bring a subsequent pallet and workpiece into position at the respective conveyor stations.

Figure 3:
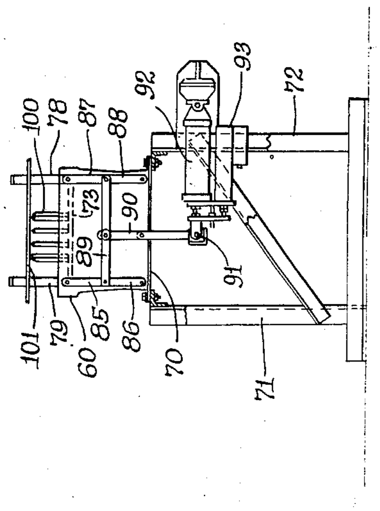
Fig. 3 is a front elevational detail of the molten solder container with the heat conductive solder cup members in the raised position.
Figure 2:
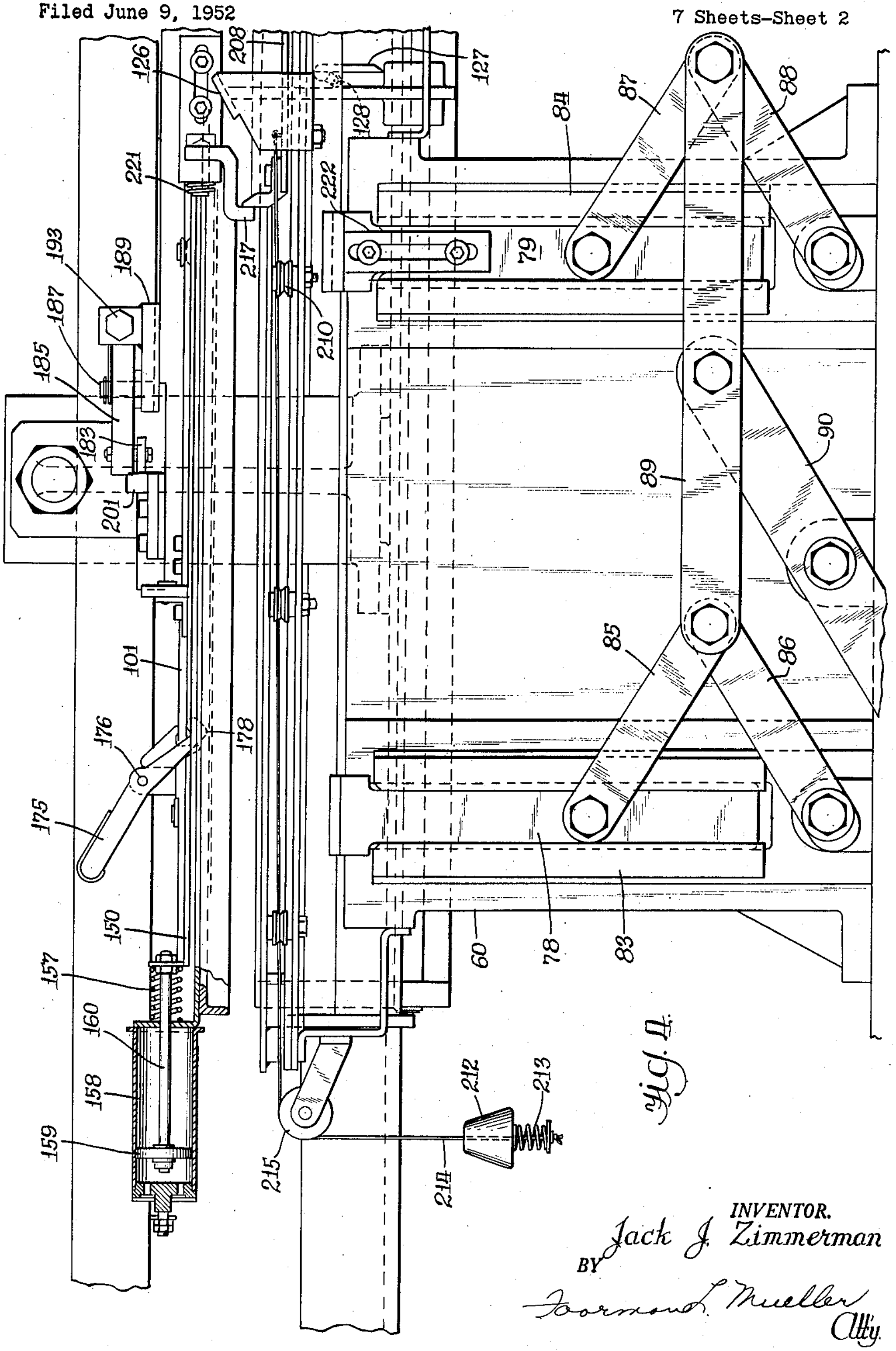

A detail elevational view of the molten solder container 60 is shown by Fig. 3 of the drawings. The other solder container 61 and the flux containers 62 and 63 are essentially the same and will not be specifically described. The solder container 60 is mounted on a suitable base 70 supported by legs such as shown at 71 and 72. A platform 73 is mounted within the solder container 60 and is adapted to be raised or lowered by the brackets 74—77 (Figs. 7 and 9) which are connected to slide members 78—81 (Figs. 3, 4 and 9). The details of the elevating mechanism are more clearly shown in Figs. 4, 5, 7 and 10 of the drawings wherein it will be seen that the outer slides 78—81 are carried in suitable guideways such as shown at 82 and 83 at the respective corners of the solder container 60. The slides 78—81 are arranged to be vertically reciprocated by movement of a parallel lever linkage system located on front and back sides of the solder container. The lever system such as shown on the front side of the solder container, includes the connecting links 85—88, connecting bar 89, and the operating lever 90. The operating lever 90 is pivotally connected at 91 to an air cylinder 92. When the piston of the air cylinder 92 is moved to the right and the position shown by Fig. 3 of the drawing, the lever 90 is operated to move the lever system and raise the platform 73 to bring the soldering members 100 into soldering contact with the underside of the workpiece 101 carried by a pallet assembly such as shown at 36. When the piston of the air cylinder 92 is moved to the left, the lever system assumes the position shown in Fig. 4 and the platform 73 is lowered together with the soldering members 100 to be fully immersed in the bath of molten solder in the solder container 60. The operation of the air cylinder 92 is controlled by suitable solenoid operated valves actuated by an electrical control circuit to be later described in detail. An hydraulic check device 93 is associated with the piston arm of the air cylinder 92 to limit the movement of the piston arm to the right and exactly predetermine the maximum elevated position of the soldering members 100 as shown in Fig. 3 of the drawings. The hydraulic check device 93 is a commercially available device and its construction need not be further described except to point out that its function is to retard the upward movement of the platform 73 and solder members 100 at the moment that the meniscus surface of the solder on the upper ends of each solder member contacts the circuit connection to be soldered. The final upper resting position of the platform 73 and solder members 100 is also determined by the hydraulic check device 93 to be in a position with the upper ends of the solder member just out of physical contact with the under surface of the workpiece 101.

Figure 7:
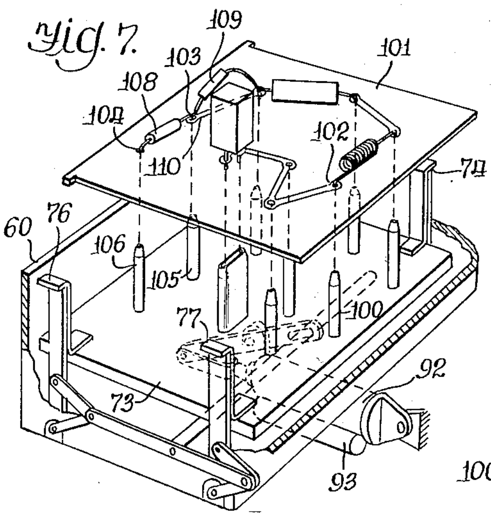
Fig. 7 is a diagrammatic perspective view showing a typical electrical chassis member to be soldered and the working arrangement of the soldering mechanism.

Referring to Figs. 7 and 8 of the drawings, the working relationship of the platform 73 and solder members 100 in regard to the workpiece is more clearly illustrated. The workpiece 101 is supported in an accurately predetermined horizontal plane over the molten solder container 60 with the various circuit connections such as shown 102, 103, 104, etc., in alignment with the upper ends of the respective soldering members 100, 105 and 106. As more clearly shown in Fig. 5 of the drawings, the solder member 105 may be of different form than the solder member 100 and is of larger diameter to provide a larger body volume. The heat transfer capacity of the solder member 105 is therefore greater than the solder member 100, as may be required for soldering the connection 103 at which both of the electrical components 108 and 109 are joined to the printed circuit contact 110. Similarly, the solder member 111 may be of different form for simultaneously soldering both of the connections 112 and 113 of a transformer type of electrical component 114. It should be understood that the solder will adhere only to the electrically conductively coated portions on the insulating chassis sheet 101 so that a short circuiting solder connection will not be established between contacts 112 and 113, provided the conductive portions of the printed circuit do not extend between the contacts 112 and 113. As clearly shown in Fig. 8 the solder contained in the cup-like depression 115 forms a convex meniscus surface 116 which when contacted with the circuit connection to be soldered is effective to transfer a controlled amount of heat from the body of the solder member and the bath of molten solder. The member 115 may be lined with steel at 117 to enable the solder contained therein to wet the walls of the cup, but the rim of the cup presents a non-wetting surface which prevents easy flow of the solder over the rim. Such arrangement is important, not only to secure the convex meniscus surface 116, but in order to prevent the occlusion of flux and gases within the cup which would interfere with the proper soldering operation.

The main body of each solder member is preferably formed of a high heat conductive metal such as aluminum which is coated with a chromic acid anodized coating to prevent the aluminum from being dissolved in the molten solder within the solder container 60. Molten solder will dissolve many metals, which when dissolved in the solder bath, will contaminate the solder to the point where it is no longer useful and must be discarded. A coating of refractory cement 120 (Figs. 8 and 8*a*) is applied to the upper exterior surface of each solder member 100 to function as a wick for absorbing excess flux which may have been applied by the elevating mechanism contained in the liquid flux containers 62 and 63, and also to serve as a non-wetting agent at the rim of the steel lining 117. In this manner the meniscus is retained at such rim for the purposes described. In addition, as can be seen in Fig. 8*a*, the cement extends slightly beyond the aluminum rod 100 edge, and thus prevents contact with it by the molten solder in the cup.

Figure 5:
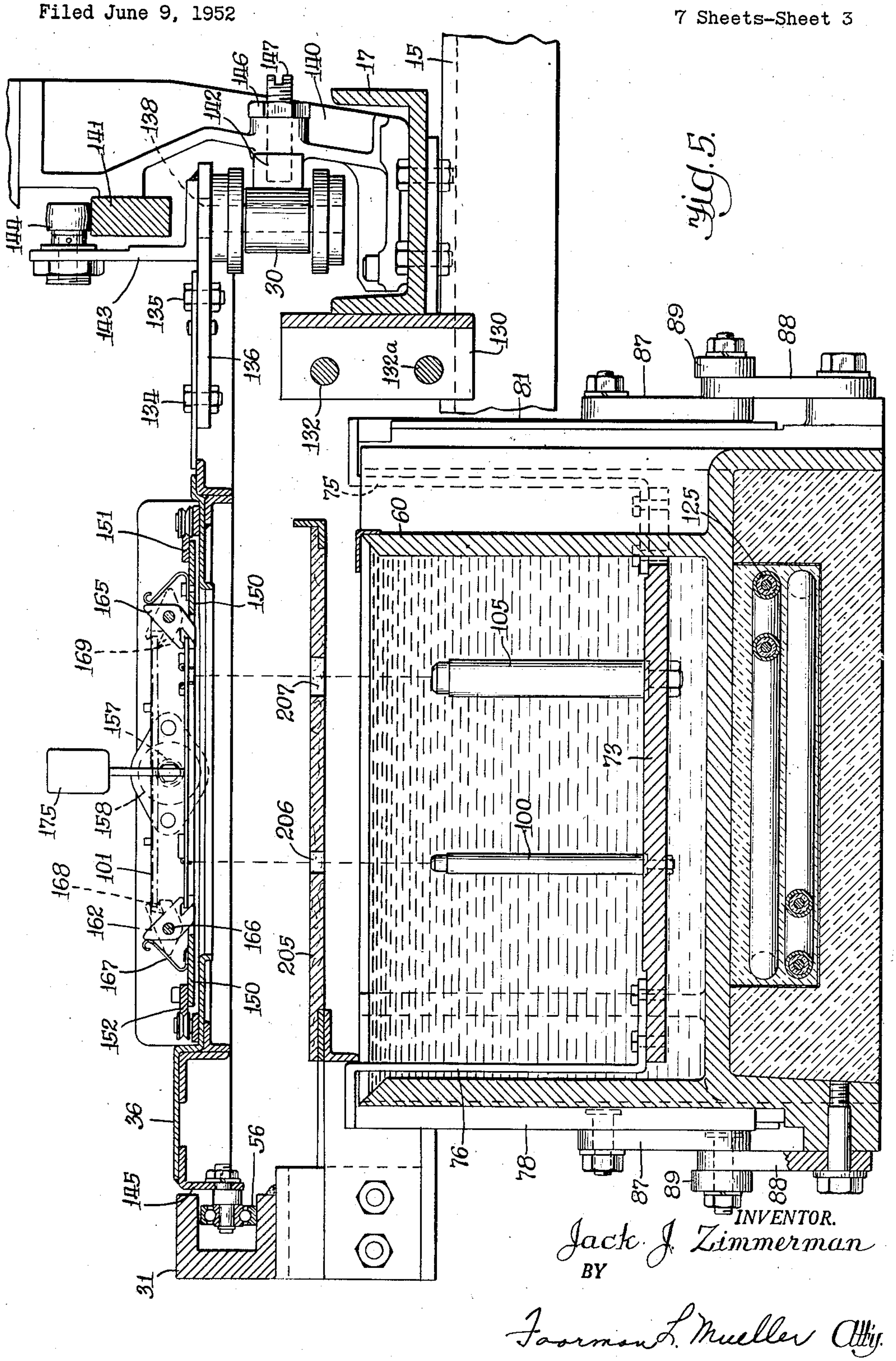
Fig. 5 is a detailed cross-section through the solder container and chassis supporting pallet assembly generally on the line 5—5 of Fig. 9.
Figure 6:
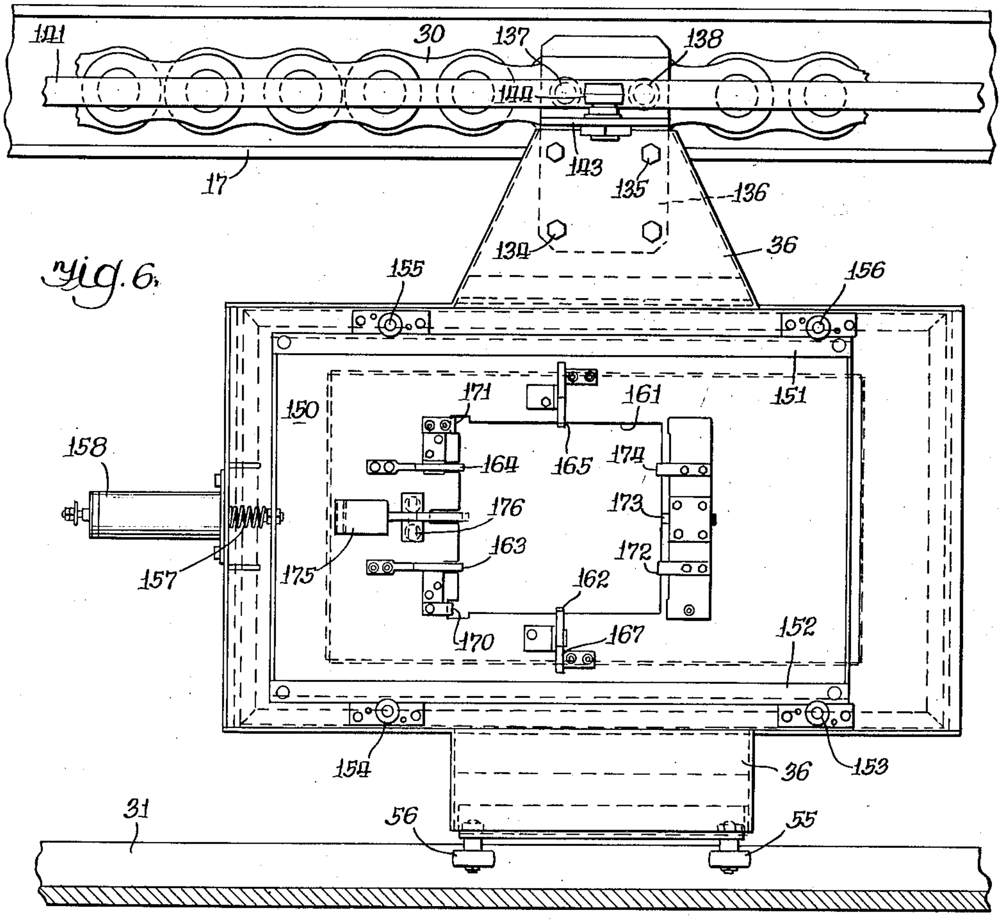
Fig. 6 is a top plan view of the chassis supporting pallet assembly together with the conveyor chain and supporting rails therefor.

Further details of the machine are shown in Figs. 5 and 6 of the drawing. An electric heating coil 125 is enclosed within the base of the solder container 60 to melt the solder contained therein. The pallet assembly main frame 36 is fastened by bolts such as shown at 134 and 135 to a plate 136 that is secured at 137 and 138 to the conveyor chain 30. An upwardly extending stationary bracket member such as shown at 140 is bolted to either the upper rail 17 or 18 at each station rest position of the conveyor. Each bracket 140 supports a continuously extending upper guide rail 141 and a guide shoe 142. Guide shoe 142 is adapted to engage the side of a roller of the conveyor chain 30 and precisely determines the position of the pallet assembly 36 over the solder container 60 in the direction transverse to the direction of conveyor travel. An upwardly extending bracket 143 is secured to the plate 136 and the roller 144 is carried thereby to engage the longitudinally extending guide rail 141. Similarly, the rollers 55 and 56 are supported on depending brackets such as shown at 145. The rollers 55 and 56 are engaged within the groove of the U-shaped channel guides 31 or 32 as the conveyor moves. Each of the guide rollers 55, 56 and 144 are mounted on eccentric spindles whose angular position may be changed to adjust the exact supporting plane of the pallet main frame 36. The side guiding shoe 142 may be adjusted by means of the locknut 146 and set screw 147. In such manner the exact path of movement of the pallet assembly 36 and the workpiece carried thereby may be predetermined with relation to the solder container 60 and the elevating soldering members contained therein.

Mounted within the pallet main frame 36 is a slidably movable sub-frame assembly which may be termed a sub-pallet. The sub-pallet may consist of the rectangular sheet of metal 150 having slide rails 151 and 152 secured to the opposite longitudinal sides thereof. The slide rails 151 and 152 are adapted to slide within the grooves of grooved wheels 153—156 which are rotatably supported on the main pallet frame 36. A coiling spring 157 engages between the main frame 36 and the sub-pallet 150 to normally urge the sub-pallet to the right in the direction of the conveyor travel. As more clearly shown in Figures 4 and 6, a snubbing air cylinder 158 having a piston 159 and piston rod 160 is connected to the sub-pallet 150 to cushion the movement of the sub-pallet assembly 150 with respect to the main pallet frame 36.

A cutout portion 161 of the sub-pallet 150 is adapted to receive the workpiece 101. In order to enable the workpiece 101 to be quickly and accurately secured and registered within the opening 161 of the sub-pallet assembly 150, a plurality of spring actuated toggles 162–165 are provided. As most clearly shown in Figs. 5 and 6 the drawings, each of the spring toggles such as the one shown at 162 are pivoted at 166 and are cammed by springs such as shown at 167 to normally assume either the solid line position or the dotted line position of Fig. 5. The operation of the spring 167 is such as to provide a double over-center action. When the toggles are in the dotted line position shown in Fig. 5, the workpiece 101 may be placed in a position resting on the jaw surfaces such as shown at 168 and 169 of the toggles 162 and 165. A slight downward pressure on the surface of the workpiece 101 will cause the toggles to be moved to the solid line position with the workpiece firmly held by the tension of the toggle springs and accurately positioned by means of aligning points 170, 171, 172, 173 and 174. When the workpiece is to be removed handle 175 which is pivotally supported at 176 may be depressed to cause the lower end 178 of the handle to engage the underside of the workpiece 101 and force the workpiece upward to cam the toggles to the dotted line position. Thereafter the workpiece may be manually lifted to be removed from the pallet. The particular arrangement of the workpiece removing handle 175 is most clearly shown in Fig. 4 of the drawings wherein its lower end 178 is shown in the position for engaging the underside of the workpiece 101.

Referring now to Figs. 4, 5, 9 and 10 of the drawings, the structure for exactly predetermining the rest position of the sub-pallet assembly and workpiece carried thereby in the direction of conveyor travel with relation to the solder container 60 will be described. As previously mentioned, the braking mechanism for stopping the conveyor movement cannot be relied upon to exactly stop the conveyor chain 30 with the pallet assemblies in the same predetermined position with respect to solder containers 60, 61 and flux containers 62 and 63 each time that the conveyor is stopped. It is necessary to allow for a certain amount of conveyor overtravel due to variations of friction and conveyor inertia or the like. As has been previously described in connection with Figs. 5 and 6 of the drawings, the sub-pallet 150 is slidably positioned within the main pallet frame 36 and is movable in a direction parallel to the direction of the conveyor travel. The slide rails 151 and 152 of the sub-pallet 150 are provided with positioning devices comprising the cam-shaped abutments 180 and 181. As the movement of the conveyor chain 30 and the pallet assembly 36 comes to a stop, the cam abutments 180 and 181 are engaged by rollers 182, 183 on the end of bellcrank arms 184, 185 which are pivoted at 186, 187 on plates 188, 189 secured to the stationary framework of the machine. Coil springs 190, 191 normally urge the bellcranks 184, 185 to the position shown with end portions thereof engaging the set screw stops 192, 193. By changing the position of the set screw stops 192, 193 the solid line position of the bellcranks 184, 185 may be predetermined and the exact rest position of the sub-pallet 150 may be likewise predetermined when the cam surfaces 180, 181 contact the rollers 182, 183 of bellcranks 184, 185. After the sub-pallet 150 has been stopped in the predetermined rest position by the bellcranks 184, 185, the main pallet frame 36 and conveyor 30 may continue to move a slight amount in the direction of conveyor travel to compress the spring 157 and cause a relative longitudinal movement between the main pallet frame 36 and the sub-pallet 150.

After completion of a soldering operation and subsequent lowering of the solder cups into the solder container, the conveyor chain 30 is again operated to move the pallet assembly 36 in the direction of the arrow. A pair of cam projections 200, 201 are carried by the pallet main frame 36 and engage cam surfaces 202, 203 on the underside of the bellcranks 184, 185 respectively, to cam the bellcranks against the tension of the springs 190, 191 out of the path of the cam projections 180, 181 of the sub-pallet assembly 150. In camming the bellcranks 184, 185 out of the path of the sub-pallet assembly 150, the sub-pallet 150 is constrained to be moved a small additional distance opposite to the movement of the conveyor travel and against the tension of the spring 157. The shock absorbing device 158 serves to prevent any sudden movement of the sub-pallet 150 upon its release for movement with the conveyor. It should be understood that the cam projections 200, 201 also function to permit the continuous movement of the conveyor with the pallet assemblies moving through the conveyor stations.

Referring now more particularly to Figs. 4, 5 and 10 of the drawings, a heat shield or cover mechanism for the open top end of the solder container will now be described. An asbestos cover 205 having perforations such as shown at 206 and 207 is secured over the upper end of the solder container 60. The asbestos cover 205 is arranged to be semi-permanently secured in a position extending over the upper surface of the molten solder in the container 60 and may be removed for purposes of renewing the solder in the container. The perforations 206, 207 are arranged to permit the passage therethrough of the solder members when the platform 73 is raised to bring the solder members into soldering position beneath the workpiece. An imperforate asbestos cover 208 is slidably positioned over the asbestos cover 205 and for this purpose grooved pulleys such as shown at 210 and 211 engage suitable guideways secured to the edges of the asbestos plate 208. The imperforate asbestos plate 208 is normally moved to a position overlying the asbestos plate 205 in response to the constant force of the weight 212 acting through the shock absorbing spring 213, and the cable 214 around pulley 215. The asbestos cover 208 is shown in Fig. 4 of the drawings in the position to which it is moved for exposing the openings of the perforated asbestos cover 205 when a soldering operation is to be performed. In place of the weight 212 and cable 214, any suitable spring tension device may be used.

The abutment 216 on the end of the asbestos plate 208 is adapted to be engaged by the pivotal latch member 217 carried on the pallet assembly frame 36. A similar pivotal latch member 218 is carried on the opposite side of the pallet assembly main frame 36 to engage abutment 216a and both latch members 217, 218 are pivoted respectively at 219 and 220. The latch members 217, 218 engage the corresponding abutments 216, 216a on asbestos plate 208 and draw the plate to the open position (shown in Figure 4) against the action of weight 212 as the pallet is moved into place over the solder container. Each latch member 217, 218 is provided with a coil spring such as shown at 221 for normally urging the latch member to the abutment engaging position as shown in the drawings. The vertically reciprocal slides 79, 80 are provided with latch engaging members 222 and 223. When the slides 79 and 80 are moved vertically upward to raise the platform 73 and soldering members 100, the members 222, 223 engage the respective pivotal latches 217, 218 to thereby pivot said latches upward out of engagement with the abutments 216, 216*a* which are secured to the sliding asbestos cover 208. A cam surface which is associated with the pivot structures 219, 220 is effective to move the pivotal latch members 217, 218 axially in the direction of conveyor travel a small amount as said latches are pivoted upward in response to the movement of the latch engaging members 222, 223. At the same time, the abutments 216, 216*a* are engaged with the longitudinally extending side portions of the latch engaging members 222, 223 to retain the asbestos cover 208 in the open position. When the vertical slides 79, 80 are again reciprocated downward to lower the soldering members out of engagement with the workpiece, the abutments 216, 216*a* are freed of their engagement with the side portions of the members 222, 223 and the weight 212 acting through the shock absorbing spring 213 and cable 214 causes the slidable asbestos cover 208 to again move to a position overlying the perforations of the asbestos cover 205 and completely shield the workpiece on the pallet assembly from the heat radiated from the molten solder in the solder container 60. In the case that the conveyor moves past the solder container 60, the latch members 217 and 218 are pivoted out of engagement with abutments 216, 216*a* by means of stationary cam surfaces such as shown at 126 to thereby release the heat shield cover 208 for returning to a position overlying the perforated cover 205 in response to the weight 212 and cable 214.

Referring now to Figs. 4, 5, 10 and 12 of the drawings, the solder wiper mechanism will now be described. It is well known that a bath of molten solder will form a scum on the surface exposed to air and it is desirable that this scum be removed prior to each soldering operation. For such purposes, the wiper blade 127 is arranged to be moved coincidentally with the movement of the sliding heat shield 208. The arrangement, as will be described, is such that the wiper blade skims the surface of the solder in the container 60 only when moving in the direction of conveyor travel when the sliding cover 208 is moved to expose the perforated cover 205. This is desirable in order that the scum will be all accumulated at one side of the container 60. The pivotally mounted wiper blade 127 is at rest outside of the container or soldering pot 60, at 130. The blade is in its active position at the left hand side of the pot 60 as shown in Fig. 12. During the scum removing movement of the wiper blade 127 to the right as shown in Fig. 12, the roller follower 128 engages the track 129 on the upper edge of the solder container 60. The blade 127 is in a vertical position. When the blade reaches the right hand side, the roller 128 being moved to the right pulls the blade over the edge of the pot 129 to a position outside thereof. When the blade 127 is moved to the left, the roller follower 128 engages the track 129 and the blade 127 is pivoted out of engagement with the surface of the molten solder. However, at the opening O the spring P (Fig. 10) pivots the blade into the pot and to the vertical position shown in full lines.

The pivotal blade 127 is supported on the bracket 131 to be engaged by the abutment 216*a* and the pivotal latch 218 to be moved coincidentally with the sliding cover 208. A pair of guide rods 132 and 132*a* support the bracket 131 and wiper blade 127 for longitudinal movement thereon as most clearly shown in Figs. 5 and 10 of the drawings.

A preferred form of solder cup structure has been previously described in connection with Figs. 5, 7 and 8 of the drawings. Fig. 11 of the drawings shows a modified form of solder cup which may be constructed entirely of a suitable heat conductive and solder resistant metal alloy such as tantalum tungsten. In the arrangement of Fig. 11 a plunger mechanism 225 is provided to be reciprocated each time the platform 73 is lowered into the bath of molten solder in the container 60. The reciprocation of the plunger 225 is effective to purge the cup 226 of solder and occluded gases after each soldering operation when the platform 73 is lowered into the container 60. Under such circumstances the remaining solder and occluded gases within the cup 226 are removed so that such gases will not be trapped beneath a new load of solder. When the platform 73 is raised, the plunger 225 is again moved inward to fill the cup 226 with solder. The openings 227 are provided to relieve the back pressure 225. The plunger 225 is provided with a coil spring 228 and a base portion 229 which contacts the bottom of the solder container 60 as the platform 73 reaches the lowermost extent of its travel. With the above described arrangement, a predetermined quantity of solder in the cup 226 is assured and the occlusion of gases therewith is prevented. It should be understood that other arrangements of solder cups may be provided within the spirit of the invention and that the two forms that have been particularly described are representative only of various working embodiments.

It is believed that the soldering method of the invention has been completely described in the foregoing and that the operation of the completely automatic soldering machine should now be understood. With reference to Fig. 13 of the drawings, a wiring diagram of an electrical control circuit suitable to provide an automatic operation of the entire machine will now be described. A pair of 110 volt alternating current lines are shown at 230 and 231 to be energized by the closing of the main control switches 232 and 233. For purposes of describing the control circuit it will be assumed that the conveyor motor 23 is initially energized and the conveyor is operating to bring a pallet assembly and workpiece into a position where the switch 65 will be engaged to momentarily close its contacts. A circuit is thereby established through the normally closed switch contacts 234 to the stop relay coil 235 which opens the normally closed switch contacts 236 in a circuit connected with the motor start and stop switch 237. The motor stop and start switch 237 is only diagramatically shown and it will be understood that it actually includes a series of relays and relay circuits controlling the energization of the motor 23 and also the energization of suitable brake mechanism for the motor (not shown.) The arrangement of the motor stop and start switch 237 is such that a momentary opening of the switch contact 236 is effective to stop the motor 23 and apply the conveyor brake. Similarly the closing of the normally open switch contacts 238 of relay 314 to be later described is effective to release the conveyor brake and energize the conveyor motor 23 to start the conveyor moving when other switches in the circuit therewith are also closed in a manner to be later described for energizing relay coil 314. The relay 314 may be termed a cup safety relay and is energized when the series connected switches 300—303 are all closed by the lowering of the elevating platforms of the soldering and flux applying mechanisms 60—63 (Fig. 2).

The deenergization of the conveyor motor 23 by the momentary energization of the relay 235 is arranged to cause the conveyor to come to rest with a pallet assembly continuously engaging the switch 66 to close the normally open contacts of such switch. The closing of the switch contacts 66 establishes a circuit from lines 258, 259, 260 through switch contacts 250 in the solid line position shown, line 251 and time delay relay coil 252. After a predetermined time delay interval sufficient to assure that the conveyor and pallet assembly are completely at rest and that a pallet assembly and workpiece is not moving through, the time delay relay 252 is effective to close switch contacts 255 and energize the moving safe relay coil 256 through lines 260 and 261. The energization of coil 256 moves its switch arm to the dotted line position into engagement with the contact 257 which thereby deenergizes the time delay relay 252 and also establishes a holding circuit from lines 258 and 259, through switch 66, line 260, and switch contact 257 to line 261 and the starting terminal 5 of the work timer 262.

Both the work timer 262 and the solder timer 263 are a form of commercially available interval timing device such as the Interval Timer Model No. 2805 manufactured by the Automatic Temperature Control Co. of Philadelphia, Pennsylvania. Such interval timer construction employs an electric timing motor and an electrically operated clutch together with suitable gearing for providing predetermined switching actions after predetermined time intervals. The arrangement of the work timer 262 and the solder timer 263 is such that the connection of suitable electric power across terminals 5 and 264 or 265 and 266 respectively, is effective to energize the clutch and engage the respective timing mechanisms and timing motors. The timing motor of the work timer 262 and the solder timer 263 is energized when electric power is applied across the terminals 267, 264 and 268, 266, respectively.

Terminal 267 of the work timer is connected by line 269 to line 260 and through the now closed switch 66 so that the timer motor is energized and a contact is established between terminals 272 and 274 to connect electric power to the terminal 265 of the solder timer for engaging the clutch mechanism of the solder timer. Terminal 268 of the solder timer, which controls the energization of its timing motor is connected in parallel with the terminal 267 of the work timer motor whose energization has already been described. Therefore, at such time as the clutch terminal 265 is energized, the solder timer mechanism establishes a contact between terminals 275 and 276 to connect the secondary winding 277 of the cup transformer 278 to the coils of the solenoid valves 279—282. The solenoid coils 279—282 when energized, open valves for applying air to the respective elevating cylinders of the soldering mechanisms 60, 61 and the fluxing mechanisms 62, 63 in a manner to raise their associated platforms such as platform 73 and solder members 100 into operative engagement with the workpieces supported on the pallets of the conveyor structure. After a predetermined time interval determined by the time setting of the solder timer 263, the circuit between terminals 275 and 276 is interrupted and a circuit is established between terminals 275 and 285. The closing of a circuit between terminals 275 and 285 is effective to deenergize solenoid coils 279—282 and energize the solenoid coils 286—289 of the valving for controlling the air operating cylinders such as the cylinder 92 in a manner to lower the solder cups and flux cups out of contact with the workpieces.

At the moment that the electric motor of the work timer 262 was energized and contact was established between terminals 272 and 274, a time delay relay 290 was energized through lines 291, 292 and switch contacts 293 in the solid line position shown. The time delay relay 290 is designed to have a delay interval slightly less than the total work time interval of operation of the work timer and at the end of such delay interval the switch contacts 294 are closed to energize a warning light 295 which remains energized by the relay coil 296 and its holding circuit established through the switch contacts 293, in their dotted line position. After the establishment of the holding circuit by the relay 296 the time delay relay 290 is again deenergized for a subsequent operation.

Switches 300—303 are positioned to be closed when each of the elevating platforms of the respective solder containers 60, 61 and flux containers 62 and 63 are in the lowermost position. While the elevating platforms are raised with the solder members or flux members carried thereby in engagement with the workpieces, the lights 304—307 are energized and the switch contacts 300—303 are opened. At the end of the work time interval as determined by the work timer 262, the circuit between terminals 272 and 274 is broken and a circuit is established between terminals 272 and 308. The circuit across terminals 272 and 308 may be traced from line 230 through lines 258, 259, switch 66, line 269, work timer terminals 272 and 308 through line 309, cycle selector switch 310, line 311, normally closed switch 312 to switch contacts 238. Switch contacts 238 will be closed if the cup safety relay coil 314 is energized, which is obtained when all of the soldering and flux applying mechanisms are in the down position to close switches 300—303. The closing of the switch contact 238 and the previously mentioned establishment of a contact between terminals 272 and 308 of the work timer 262 is then effective to operate the motor stop and start switch 237 in a manner to energize the conveyor motor 23 and start the movement of the conveyor and workpieces to a subsequent station.

The circuit arrangement of Fig. 13 also includes a number of additional manual switches which enable various manual operations to be performed independent of the automatically operating cycle which has just been described. For example, manually operated switches 318 and 319 are provided to obtain a manual control of the raising and lowering of the elevating platforms when desired. The manually operated normally open switch 320, when closed, will start the conveyor motion before the end of the work time interval and always provided that the cup safety switches 300—303 are closed. The closing of the manually operated normally open switch 320 will, when the cycle selecting switch 310 is in the manual position shown by the dotted lines, enable a cycle of operation to be started independently of the operation of the work timer 262. The manually operated switch 322 which is normally closed may be operated to open the circuit to the stop and start switch 237 and stop the conveyor motor at any time that it is running. Similarly, the manually operated normally closed switch 234 may be operated to prevent the automatic stopping of the conveyor upon the arrival of a subsequent pallet assembly in a position for momentarily closing the switch 65. In other words, the operation of the switch 234 when open is effective to enable a continuous movement of the conveyor so long as the switch 234 remains open. The lights 323 and 324 are energized during the timing cycles when the contacts are established between terminals 272, 274 of the work timer 262 and terminals 275, 276 of the solder timer 263 respectively.

The work timer 262 and solder timer 263 may be set to provide various time intervals for the working cycle. In one condition of operation for the machine, three seconds is allowed for the movement of the conveyor to move the pallet assemblies and workpieces from station to station. The work timer 262 is adjusted to provide a cycle of 27 seconds during which terminals 272 and 274 are electrically connected together. Within the work cycle of 27 seconds, the solder timer 263 is operated to provide a total solder timing interval of 8 to 10 seconds during which the platforms with solder and flux applying members are raised into engagement with the electrical connections of the workpieces to be soldered.

In the foregoing, a presently preferred circuit arrangement for providing an automatic cycle of operation of the machine has been described, but it should be understood that various other circuit arrangements may be devised for controlling the operation of the machine. Although air operated servo-mechanisms have been described for purposes of raising and lowering the soldering and fluxing mechanisms, it should be understood that other arrangements may be used such as hydraulically operated servo-mechanisms or electric motor driving mechanisms. In its broadest aspect, the novel method of the invention which has been termed a method of contact soldering is not limited to its use with the particular machine apparatus which has been described. The machine apparatus as described, has been particularly intended to provide a continuously operating automatic arrangement whereby a plurality of workpieces such as printed circuit radio chassis members may be assembled and soldered in successive timed relation. It should be understood, therefore, that the novel method of contact soldering may be advantageously employed with a much simpler apparatus designed for operation upon various kinds of workpieces and with non-automatic control arrangements.

Various modifications may be made within the spirit of the invention and the scope of the appended claims.

I claim:

1. A machine for applying solder to parts of the surface of a printed circuit panel which comprises a thin flat insulated panel having a plurality of thin metal conductors secured thereon and substantially flush therewith and having a plurality of holes with metal therein, said machine including a container for molten solder, conveyor means having supporting portions for each of a plurality of insulated panels and movable intermittently to position successive ones of said supporting portions and the panel carried thereon horizontally over said container, solder-carrying means positioned within said container and movable vertically to carry the solder into soldering contact with a panel supported thereover, elevator means supporting said solder-carrying means for movement from a lower position below the level of solder in said container to an upper position adjacent to the underside of the panel, said solder-carrying means having a plurality of rims defining a selected solder surface configuration such that the solder contacts selected portions of the panel, and means to move said elevator means progressively upward to position said solder-carrying means adjacent the underside of a printed circuit panel positioned thereover with the solder in contact with the metal conductors thereon while maintaining a convex upwardly extending solder surface on said solder-carrying means.

2. A machine for applying solder to a plurality of spaced metallized portions on the surface of an insulated panel having a circuit pattern of thin metal conductors on a side thereof, said machine including a container for molten solder, conveyor means having a supporting portion for an insulated panel and movable intermittently to position said supporting portion and a panel carried thereon horizontally over said container, solder-carrying means positioned within said container and movable vertically to carry solder into soldering contact with a panel supported thereover, a heat insulating cover positioned over said container to protect a panel supported thereover except during movement of said solder-carrying means and having a normally closed position over said container, means for moving said cover to and from an open position, and elevator means operable to move said solder-carrying means from a lower position below the level of solder in said container to an upper position adjacent the underside of a panel supported thereover with the solder carried thereon in contact with the metal portions to be soldered on the panel.

3. A machine for applying solder to parts of the surface of a printed circuit panel comprising a thin insulated panel having a circuit pattern of thin metal conductors on a side thereof and having a plurality of holes having metal in the bores thereof; said machine including a container for molten solder, conveyor means having supporting portions for each of a plurality of insulated panels and movable intermittently to position successive ones of said supporting portions and the panel carried thereon horizontally over said container, a heat insulating cover positioned over said container to protect a panel supported thereover except during movement of said solder-carrying means and having a normally closed position over said container, means to move said cover to and from an open position, solder-carrying means positioned within said container and movable vertically to carry solder into soldering contact with a panel supported thereover, elevator means operable to move said solder-carrying means from a lower position below the level of solder in said container to an upper position adjacent the underside of a panel positioned thereover, said solder-carrying means having a plurality of rims defining a selected solder surface configuration such that the solder contacts selected portions of the underside of the panel, and said solder-carrying means in said upper position being positioned with only the surface of the solder carried thereon in contact with the metal portions to be soldered on the panel.

4. The method of contact soldering selected metal portions on a printed circuit panel comprising a thin insulated panel with a circuit pattern of thin metal conductors on a side thereof, which includes the steps of providing a solder-carrying means having a shape operable to support solder for selective application to selected portions of a printed circuit panel, moving said solder-carrying means upwardly from below the surface of a quantity of molten solder to form at least one convex solder meniscus supported on and projecting above said solder-carrying means and to move said meniscus toward the underside of said panel, decelerating the upward movement of said solder-carrying means after it emerges from the molten solder so as to prevent destruction of said solder meniscus, and thereafter completely arresting the movement of said solder-carrying means in a position adjacent the underside of the panel and with said solder meniscus in contact with selected metal portions on the underside of the panel.

5. A machine for selectively applying solder to a printed circuit panel comprising a thin insulated panel with a circuit pattern of thin metal conductors on a side thereof, said machine including in combination, a container for molten solder, a conveyor having a fixed support and a movable member carried thereby, a panel supporting means secured to said movable member and movable thereby over said container, said panel supporting means being adapted to hold a printed circuit panel in a selected position over said container, solder-carrying means supported within said solder container having an upper end portion formed for the selective application of solder to the metal conductors on the panel and operable to support a convex solder meniscus extending above said upper end portion, means for moving said solder-carrying means upward from below the surface of a quantity of molten solder in the container to collect a quantity of molten solder which when collected has a meniscus projecting upwardly from said upper end portion and to move said solder meniscus toward the underside of the panel, and means for arresting the movement of said solder-carrying means with said upper end portion positioned adjacent the underside of the panel and with said solder meniscus in contact with the metal conductors on the panel.

6. The method of contact soldering metal portions on a printed circuit panel comprising a thin insulated panel with a circuit pattern of thin metal conductors on a side thereof, which includes the steps of providing solder-carrying means operable to support solder for application to metal portions on the underside of a printed circuit panel, providing sufficient solder to form at least one convex solder formation extending upwardly from said solder-carrying means, and establishing the relative positions of said solder-carrying means and the printed circuit panel so that said solder-carrying means is disposed adjacent the underside of the panel with said convex solder formation contacting the metallic conductors on the underside of the printed circuit panel.

7. A machine for applying solder to parts of the surface of a printed circuit panel which comprises a thin insulated panel having a circuit pattern of thin metal conductors on a side thereof, said machine including a container for molten solder, endless conveyor means having a plurality of supporting pallets for each of a plurality of printed circuit panels, releasable means on each of said pallets for holding a printed circuit panel thereon, means to move said conveyor means intermittently to position successive ones of said pallets and the panel carried thereon horizontally over said molten solder container, solder-carrying means positioned within said container and movable vertically to carry solder into soldering contact with a panel supported thereover, elevator guide means on the machine, elevator means guided by said guide means and supporting said solder-carrying means for movement from a lower position below the level of solder in said container to an upper position adjacent the underside of the panel, said solder-carrying means having a plurality of rims defining a selected solder surface configuration such that the solder contacts only selected portions of the panel, and fluid pressure actuated means operatively connected to said elevator means to move said elevator means progressively upward to position said solder-carrying means adjacent the underside of a printed circuit panel positioned thereover with the solder in contact with the metal conductors thereon while maintaining a convex upwardly extending solder surface on said solder-carrying means.

8. A machine for applying solder to parts of the surface of a printed circuit panel which comprises a thin insulated panel having a circuit pattern of thin metal conductors on a side thereof, said machine including a container for molten solder, a movable heat shielding cover mounted on and normally closing said molten solder container and movable from a closed to an open position, means for moving said cover to and from an open position, conveyor means having a plurality of panel supporting pallet portions, releasable means on each of said pallet portions for securing a printed circuit panel thereon, means to move said conveyor means intermittently to position successive ones of said pallet portions and the panel carried thereon horizontally over said container, solder-carrying means positioned within said container and movable vertically to carry the solder into soldering contact with a panel supported thereover, elevator means supporting said solder-carrying means for movement from a lower position below the level of solder in said container to an upper position adjacent to the underside of the panel, said solder-carrying means having a plurality of rims defining a selected solder surface configuration such that the solder contacts only selected portions of the panel, and means to move said elevator means progressively upward to position said solder-carrying means adjacent the underside of a printed circuit panel positioned thereover with the solder in contact with the metal conductors thereon while maintaining a convex upwardly extending solder surface on said solder-carrying means.

9. A machine for simultaneously applying solder to a plurality of spaced metal portions on one side of a chassis member including in combination, a container for molten solder, means for supporting a chassis member over said container, an elevator, means for mounting said elevator in said container for movement from a lower position within said container to an upper position, a plurality of upwardly extending finger-like solder holders supported on said elevator in selected mutually spaced positions and each having a cup-shaped depression formed at its top end to contain solder therein, the top ends of said solder holders being below the normal solder level within said container when said elevator is in its lower position and being at a soldering position above the solder level when said elevator is in its upper position, each of said cup-shaped depressions having a surface of solder-wettable material and a rim of solder non-wettable material operable to support a convex meniscus extending upwardly from the solder in each of said depressions, and means for moving said elevator between its lower position and its upper position with the upper position being established so that only the convex meniscus of the solder in each solder holder contacts the metal portions of the chassis member.

10. The invention of claim 9 wherein each of said cup-shaped depressions at the top ends of said solder holders is lined with steel to be wetted by the solder to prevent the occlusion of gases within said depressions, and wherein the rim of each of said depressions is coated by a solder non-wettable material which is operable to support a convex meniscus extending upwardly from the solder in each depression.

11. The invention of claim 9 wherein each of said upwardly extending solder holders is formed of a metal that is relatively insoluble in molten solder, and one of said solder holders includes a bore extending longitudinally therethrough from said cup-shaped depression to the bottom of said solder holder, a plunger formed of a solder-resistant metal positioned within said bore and having a lower portion protruding a selected distance through the bottom of said solder holder, spring means normally urging said plunger to a lowered position within the bore, and means secured to said lower portion of said plunger adapted to engage the bottom of said container as said elevator is lowered to the lower position and move said plunger to an upper position within said bore.

12. A machine for simultaneously applying solder to a plurality of spaced metal portions on one side of a chassis member including in combination, a container for molten solder, a conveyor having a fixed framework and a moving member carried thereon, a chassis supporting means affixed to said moving member and movable thereby over said container, means to move and rest said moving member intermittently with said supporting means centered over said container when said moving member is at rest, an elevator, means for mounting said elevator in said container for movement from a lower position within said container to an upper position beneath the underside of a chassis member supported by said supporting means when said moving member is at rest, a plurality of upwardly extending finger-like solder holders supported on said elevator in selected mutually spaced positions and each having a cup-shaped depression formed at its top end to contain solder therein, the top ends of said solder holders being below the normal level of solder within said container when said elevator is in the lower position and carrying solder into contact with the spaced metal portions on the underside of a chassis member when said elevator is in the upper position, each of said cup-shaped depressions having a surface of solder-wettable material and a rim of solder non-wettable material operable to support a convex meniscus extending upwardly from the solder in each of said depressions, and means for moving said elevator between its lower position and its upper position with the upper position being established so that only the convex meniscus of the solder in each solder holder contacts the metal portions of the chassis member.

13. A machine for simultaneously applying solder to a plurality of spaced metal portions on one side of a chassis member including in combination, a container for molten solder, a conveyor having a fixed framework and a moving member carried thereon, a chassis supporting means affixed to said moving member and movable thereby over said container, first guide means associated with said conveyor framework and said supporting means to predetermine the elevation of said supporting means over said container, second guide means associated with said conveyor framework and said moving member to predetermine the position of said supporting means over said container in the direction transverse to the direction of conveyor movement, means to move and rest said moving member intermittently with said supporting means centered over said container when said moving element is at rest, an elevator, means for mounting said elevator in said container for movement from a lower position within said container to an upper position beneath the underside of a chassis member supported thereover by said supporting means when said moving element is at rest, a plurality of upwardly extending solder holders mounted on said elevator in selected mutually spaced positions and each having a cup-shaped depression formed in its upper end to contain solder therein, the upper ends of said solder holders being below the normal level of solder within said container when said elevator is in the lower position and carrying solder into contact with the spaced metal portions on the underside of a chassis member when said elevator is in the upper position, each of said cup-shaped depressions having a surface of solder-wettable material and a rim of solder non-wettable material operable to support a convex meniscus extending upwardly from the solder in each of said depressions, and means for moving said elevator between its lower position and its upper position with the upper position being established so that only the convex meniscus of the solder in each solder holder contacts the metal portions of the chassis member.

14. A machine for simultaneously soldering a plurality of spaced metal portions on one side of each of a plurality of chassis members in succession including in combination, an endless conveyor and a supporting framework therefor, a plurality of chassis supporting means mounted at spaced points along said conveyor, a container for molten solder, means to move and rest said conveyor intermittently to position said chassis supporting means successively over said container, means responsive to movement of any one of said supporting means to a position over said container for initiating a rest period for said conveyor, an elevator, means for mounting said elevator for movement from a lower position within said container to an upper position beneath the underside of a chassis member when said conveyor is at rest, a plurality of upwardly extending solder holders mounted on said elevator in selected mutually spaced positions and each having a cup-shaped depression formed in its upper end to contain solder therein, the upper end of said solder holders being below the normal level of solder within said container when said elevator is in the lower position and carrying solder into contact with the spaced metal portions on the underside of a chassis member when said elevator is in the upper position, means to move said elevator to the upper position upon said conveyor coming to rest, means to return said elevator to the lower position after a predetermined time interval in the upper position, and means to initiate movement of said conveyor to bring a successive chassis supporting means over said container after said elevator has returned to the lower position, each of said cup-shaped depressions having a surface of solder wettable material and a rim of solder non-wettable material operable to support a convex meniscus extending upwardly from the solder in each of said depressions, whereby only the convex meniscus of the solder in each solder holder contacts the metal portions of each chassis member when said elevator is in said upper position.

15. A machine for simultaneously applying solder to a plurality of spaced metal portions on one side of a chassis member including in combination, a container for molten solder having a top end, a slidably mounted heat shielding cover for said top end movable from a closed to an open position over said container, biasing means for maintaining said cover in a normally closed position, conveyor means for moving a chassis member across the top end of said container and for positioning such chassis over said top end, means secured on said conveyor and engageable with said cover during the positioning of the chassis member over said container to move said cover against said biasing means to said open position to expose the molten solder in said container, an elevator, means for mounting said elevator in said container for movement from a lower position within said container to an upper position beneath the underside of a chassis member when said cover is open, said elevator having a plurality of upwardly extending solder holders adapted to be submerged in the solder within said container when said elevator is in the lower position, said solder holders being mounted on said elevator in spaced positions to carry solder on their upper ends into contact with the spaced points on the underside of said chassis member when said elevator is in said upper position, and means for moving said elevator between said lower position and said upper position.

16. A machine for simultaneously applying solder to a plurality of spaced metal portions on one side of a chassis member including in combination, a container for molten solder having an open top end, conveyor means for moving a chassis member across the top end of said container and for positioning such chassis over said top end, an elevator, means for mounting said elevator in said container for movement from a lower position within said container to an upper position beneath the underside of a chassis member supported by said conveyor means, said elevator having a plurality of upwardly extending solder holders adapted to be submerged in the solder within said container when said elevator is in the lower position, said solder holders being mounted on said elevator in spaced positions to carry solder on their upper ends into contact with spaced metal portions on the underside of the chassis member when said elevator is in the upper position, means for moving said elevator between said lower position and said upper position, a heat shielding cover positioned over the open top end of said container, said cover having perforations through which said solder holders may extend when said elevator is raised, a slidably mounted imperforate cover movable from a closed to an open position over said heat shielding cover, biasing means for maintaining said imperforate cover in a normally closed position, and means secured on said conveyor and engageable with said imperforate cover during the positioning of the chassis member over said container to move said imperforate cover to its open position exposing the perforations of said first-mentioned heat shielding cover.

17. A machine for simultaneously applying solder to a plurality of spaced metal portions on one side of a chassis member including in combination, a container for molten solder having a top end, a heat shielding cover slidably mounted over the top end of said container and movable from a closed to an open position, means for maintaining said cover in a normally closed position, a conveyor having a fixed framework and a moving member carried thereon, a chassis supporting means mounted on said moving member and movable thereby over said top end of said container, means to move and rest said moving member intermittently with said supporting means centered over said container when said moving member is at rest, means secured to said moving member and engageable with said cover during the centering of said supporting means over said container to move said cover from the normally closed position and expose the molten solder in said container, an elevator, means for mounting said elevator in said container for movement from a lower position within said container to an upper position beneath the underside of the chassis member when said moving element is at rest, means for moving said elevator between said lower position and said upper position, said elevator having a plurality of upwardly extending solder holders adapted to be submerged in solder within said container when said elevator is in the lower position, and said solder holders carrying solder on their upper ends into contact with spaced points on the underside of the chassis member when said elevator is in the upper position.

18. A machine for simultaneously soldering a plurality of spaced metal portions on one side of each of a plurality of chassis members in succession including in combination, an endless conveyor and a supporting framework therefor, a plurality of chassis supporting means mounted on said conveyor at spaced points along said conveyor, a container for molten solder having an upper end, a movable heat shielding cover slidably mounted over said upper end of said container and movable from a closed to an open position, means for maintaining said cover in a normally closed position, said conveyor being positioned in such relation to said container that said supporting means are moved over said upper end of said container successively as said conveyor is moved, means to move and rest said conveyor intermittently and including means responsive to movement of one of said supporting means to a position over said container for initiating a rest period for said conveyor, a control latch secured to said conveyor for engaging said cover during the positioning of any one of said supporting means over said container to move said cover to said open position exposing said molten solder, an elevator mounted for movement from a lower position within said container to an upper position beneath the underside of one of the chassis members when said conveyor is at rest, said elevator having a plurality of upwardly extending solder holders adapted to be submerged in solder within said container when said elevator is in the lower position, said solder holders carrying solder on their upper ends into contact with spaced points on the underside of the chassis member when said elevator is in the upper position, means to move said elevator to the upper position upon said conveyor coming to rest, means to return said elevator to the lower position after a predetermined time interval in the upper position, means responsive to the return of said elevator to said lower position to disengage said control latch from said cover to return the same to said normally closed position, and means to initiate movement of said conveyor to bring a successive chassis member over said container after said elevator has returned to said lower position.

19. A machine for simultaneously applying solder to a plurality of spaced metal portions on one side of a flat chassis member including in combination, a container for housing a quantity of molten solder, an elevator mounted within said container and movable therein between a lower and an upper position, a plurality of distinct elongated solder-carrying members mounted on said elevator and extending upwardly therefrom in spaced relation, said solder-carrying members each having a cup-shaped depression in its respective upper end, said cup-shaped depressions each having a surface of solder-wettable material and a rim of solder non-wettable material operable to support a convex meniscus extending upwardly from the solder carried in the depression, the upper ends of said solder-carrying members terminating in selected positions with respect to one another, means for moving said elevator between said lower and said upper positions, and said cup-shaped depressions in said upper ends of said solder-carrying members during normal operation of said machine being immersed in molten solder when said elevator is in said lower position and carrying in each depression solder with a convex meniscus extending upwardly therefrom when said elevator is moved to its upper position.

References Cited in the file of this patent

UNITED STATES PATENTS

| | | |
|---|---|---|
| 1,103,067 | McColl | July 14, 1914 |
| 1,783,642 | Fergusen et al. | Dec. 2, 1930 |
| 1,837,962 | Hensgen | Dec. 22, 1931 |
| 2,293,455 | Disch et al. | Aug. 18, 1942 |
| 2,501,616 | Robinson | Mar. 21, 1950 |
| 2,588,531 | Johnson | Mar. 11, 1952 |
| 2,608,745 | Barry | Sept. 2, 1952 |
| 2,725,026 | Brandt | Nov. 29, 1955 |